(12) United States Patent
Palmer

(10) Patent No.: US 10,023,483 B2
(45) Date of Patent: *Jul. 17, 2018

(54) LIQUID CHEMICAL COMPOSITION

(75) Inventor: Ross Leslie Palmer, Wakerley (AU)

(73) Assignee: ZODIAC GROUP AUSTRALIA PTY LTD., Smithfield (AU)

( * ) Notice: Subject to any disclaimer, the term of this patent is extended or adjusted under 35 U.S.C. 154(b) by 674 days.

This patent is subject to a terminal disclaimer.

(21) Appl. No.: 14/131,451

(22) PCT Filed: Jul. 10, 2012

(86) PCT No.: PCT/AU2012/000831
§ 371 (c)(1),
(2), (4) Date: Apr. 16, 2014

(87) PCT Pub. No.: WO2013/006909
PCT Pub. Date: Jan. 17, 2013

(65) Prior Publication Data
US 2014/0212512 A1    Jul. 31, 2014

(30) Foreign Application Priority Data
Jul. 11, 2011 (AU) ............... 2011902757

(51) Int. Cl.
| | |
|---|---|
| *C02F 1/50* | (2006.01) |
| *C02F 1/68* | (2006.01) |
| C02F 1/76 | (2006.01) |
| C02F 103/42 | (2006.01) |
| C02F 1/467 | (2006.01) |

(52) U.S. Cl.
CPC ............... *C02F 1/505* (2013.01); *C02F 1/68* (2013.01); *C02F 1/4674* (2013.01); *C02F 1/76* (2013.01); *C02F 2103/42* (2013.01); *C02F 2201/4618* (2013.01)

(58) Field of Classification Search
None
See application file for complete search history.

(56) References Cited

U.S. PATENT DOCUMENTS

| | | | |
|---|---|---|---|
| 2,825,685 | A | 3/1958 | Schachter et al. |
| 3,616,355 | A | 10/1971 | Gwinn et al. |
| 4,100,052 | A | 7/1978 | Stillman |
| 4,255,246 | A | 3/1981 | Davis et al. |
| 4,256,554 | A | 3/1981 | Bjorkman |
| 4,361,471 | A | 11/1982 | Kosarek |
| 4,790,923 | A | 12/1988 | Stillman |
| 4,997,540 | A | 3/1991 | Howlett |
| 5,045,211 | A | 9/1991 | Hamilton |
| 5,314,589 | A | 5/1994 | Hawley |
| 5,928,491 | A | 7/1999 | Yu et al. |
| 6,071,417 | A | 6/2000 | Adachi |
| 6,638,422 | B1 | 10/2003 | Schwartzkopf |
| 2003/0080069 | A1 | 5/2003 | Coffey |
| 2004/0084383 | A1 | 5/2004 | Zhou et al. |
| 2006/0016765 | A1 | 1/2006 | Dipietro et al. |
| 2006/0163085 | A1 | 7/2006 | Hanaoka |
| 2007/0193958 | A1 | 8/2007 | Martin |
| 2008/0230094 | A1 | 9/2008 | Zhou et al. |
| 2010/0234262 | A1 | 9/2010 | Smith et al. |
| 2012/0267257 | A1* | 10/2012 | Palmer et al. ............... 205/751 |
| 2013/0161267 | A1* | 6/2013 | Palmer et al. ........... 210/748.18 |
| 2013/0270193 | A1* | 10/2013 | Palmer ...................... 210/747.1 |

FOREIGN PATENT DOCUMENTS

| | | | |
|---|---|---|---|
| EP | 0470841 | | 2/1992 |
| EP | 1602629 | | 1/2008 |
| ES | 2155372 | A1 | 5/2001 |
| ES | 2224788 | A1 | 3/2005 |
| JP | 09201132 | | 8/1997 |
| WO | 9740246 | | 10/1997 |
| WO | WO9907636 | * 2/1999 | ............. C01B 11/06 |
| WO | 03040038 | | 5/2003 |
| WO | 2003073848 | A1 | 9/2003 |
| WO | 2004031077 | | 4/2004 |
| WO | 2006049811 | | 5/2006 |
| WO | 2008000029 | A1 | 1/2008 |
| WO | 2011134024 | A1 | 11/2011 |

OTHER PUBLICATIONS

U.S. Appl. No. 13/270,554, Appeal Brief, dated Mar. 26, 2015, 69 pages.
U.S. Appl. No. 13/270,554, Advisory Action, dated Dec. 9, 2014, 3 pages.
U.S. Appl. No. 13/270,554, Amendment and Response to Final Office Action, dated Dec. 1, 2014, 18 pages.
U.S. Appl. No. 13/270,554, Final Office Action, dated Sep. 30, 2014, 10 pages.
U.S. Appl. No. 13/270,554, Amendment and Response to Non-Final Office Action, dated Jun. 24, 2014, 13 pages.
U.S. Appl. No. 13/270,554, Non-Final Office Action, dated Dec. 26, 2013, 10 pages.
U.S. Appl. No. 13/512,591, Final Office Action, dated Nov. 20, 2014, 13 pages.
U.S. Appl. No. 13/512,591, Amendment and Response to Non-Final Office Action, dated Oct. 3, 2014, 16 pages.

(Continued)

*Primary Examiner* — Bethany P Barham
*Assistant Examiner* — Ping Cao
(74) *Attorney, Agent, or Firm* — Kilpatrick Townsend & Stockton LLP; Dean W. Russell; Jennifer L. Blackburn

(57) ABSTRACT

The invention provides a liquid composition when used for maintenance of a body of water, the liquid composition comprising a solution of magnesium and potassium salts, at least one of which is a halide salt. Preferably, the liquid composition comprises $Mg^{2+}$ from the magnesium salt in an amount of from about 6000 ppm to about 15 000 ppm; $K^+$ from the potassium salt in an amount from about 40 000 ppm to about 120 000 ppm and hypohalite from the halide in an amount from about 100 000 ppm to about 400 000 ppm.

12 Claims, No Drawings

(56) References Cited

OTHER PUBLICATIONS

U.S. Appl. No. 13/512,591, Non-Final Office Action, dated Jun. 4, 2014, 12 pages.
U.S. Appl. No. 13/512,591, Amendment and Response to Restriction Requirement, dated Mar. 31, 2014, 7 pages.
U.S. Appl. No. 13/512,591, Restriction Requirement, dated Feb. 27, 2014, 6 pages.
U.S. Appl. No. 13/695,252, Amendment and Response to Non-Final Office Action, dated Jul. 21, 2015, 11 pages.
U.S. Appl. No. 13/695,252, Non-Final Office Action, dated Jan. 21, 2015, 7 pages.
U.S. Appl. No. 13/695,252, Amendment and Response to Non-Final Office Action, dated Sep. 15, 2014, 10 pages.
U.S. Appl. No. 13/695,252, Non-Final Office Action, dated Jun. 13, 2014, 8 pages.
International Patent Application No. PCT/AU2010/001612, International Search Report, dated Jan. 6, 2011, 3 pages.
International Patent Application No. PCT/AU2011/000502, International Search Report and Written Opinion, dated Jun. 17, 2011, 8 pages.
Wright, et al., "An Introduction to Aqueous Electrolyte Solutions," John Wiley and Sons, 2007, pp. 429-433.
International Search Report dated Sep. 18, 2012 in International Patent Application No. PCT/AU2012/000831.
U.S. Appl. No. 13/270,554, "Final Office Action", dated May 6, 2016, 10 pages.
U.S. Appl. No. 13/270,554, "Final Office Action", dated Jul. 17, 2017, 9 pages.
U.S. Appl. No. 13/270,554, "Non-Final Office Action", dated Sep. 25, 2015, 12 pages.
U.S. Appl. No. 13/270,55, "Non-Final Office Action", dated Jan. 4, 2017, 9 pages.
Al Haq et al., "Applications of electrolyzed water in agriculture and food industries", Food Sci. Technol. Res.,vol. 11 (2), Apr. 6, 2005, pp. 135-150.

\* cited by examiner

LIQUID CHEMICAL COMPOSITION

CROSS-REFERENCE TO RELATED APPLICATIONS

The present application is the U.S. national phase of International Application No. PCT/AU2012/000831, filed on Jul. 10, 2012, published in English on Jan. 17, 2013 as International Publication No. WO 2013/006909 A, which claims priority to Australia Patent Application No. 2011902757, filed on Jul. 11, 2011, each of which is incorporated herein by this reference.

FIELD OF THE INVENTION

This invention is concerned with a liquid chemical composition for maintaining a body of water.

The invention is concerned particularly although not exclusively with maintenance of electrolytic concentrations in water of swimming pools, spas and the like to maintain water quality.

BACKGROUND OF THE INVENTION

Progressive climate change is believed to be contributing to reduced rainfall and drought conditions in many regions around the world. Diminishing supplies of water in storage reservoirs and lowering of groundwater tables have lead to the imposition by local government authorities of water restrictions of varying severity upon domestic, commercial and agricultural water users.

While owners of swimming pools can contribute somewhat to water conservation by the use of swimming pool covers to reduce evaporative losses, one major water consuming feature of a swimming pool is the requirement to backwash the pool filtration system to clear the filter of contaminants removed from the pool water, or to lower the water level after a rainstorm.

In a typical domestic swimming pool installation having a volumetric capacity of from 50,000 liters to 70,000 liters, a backwash and rinse cycle for a sand filter will consume between 1000 liters to 10,000 liters each week depending upon the amount of contamination extracted from the pool water by the filter. During the backwash and rinse cycles, water is drawn from the pool via the filter pump and then through the filter medium to a stormwater drain as required by local government authorities. Similarly, when excess water due to rainfall accumulates in the swimming pool, the level is adjusted by pumping many thousands of liters of excess water to the storm water drain or sewer line.

There are potential disadvantages arising from the currently permitted methods of disposal of waste swimming pool water, either into a storm water drain or to a sewer line.

Generally speaking, for swimming pools employing an electrolytic chlorine generator, water in the pool is required to contain about 6000 ppm of sodium chloride (NaCl) for effective operation of the electrolytic chlorinator. Such a high salt content in the backwash and rinse water renders it unsuitable for collection and use for garden irrigation as in other grey water conservation systems due to the gradual accumulation of sodium chloride in the soil leading to degenerative salination of the soil. Ultimately this could give rise to a situation where authorities deem the pool owner's property as a contaminated site requiring expensive rehabilitation.

A prior invention, as described in, for example, PCT/AU2007/000893, addresses this problem by providing an improved method of treating bodies of water using magnesium ions produced in an electrolytic halogenation cell in the water system, optionally including potassium ions, whereby the body of water can be used for, for example, watering a garden as opposed to disposal down a drain or sewer line. These swimming pools are hereinafter referred to as "improved swimming pools".

In addition to the usual electrolytic chlorinator ordinarily found in a swimming pool system, many government bodies require a swimming pool system to have a backup system for liquid chlorine dosing. Conventional liquid chlorine for use in conventional swimming pools is generated from sodium chloride solutions and added on demand to a swimming pool in need of chlorination, super-chlorination or shock treatment.

Use of conventional liquid chlorine in improved swimming pool water of the sort described above would adversely alter the mineral content in that water and prevent that water from being available for use after backwashing or emptying of the pool.

It would therefore be advantageous to provide a backup mineral dosing system which would not negate the beneficial effects of an improved swimming pool water system, or at least provide the consumer with a choice.

As used herein, the expression "swimming pool" is also intended to embrace the analogous use of spa baths, hot tubs and the like which are operated in a substantially identical manner to swimming pools. Similarly, the expression "backwash" is intended to include all water flows from a swimming pool filter to a storm water drain including backwash, rinse and bypass flows.

SUMMARY OF THE INVENTION

According to one aspect of the invention, there is provided a liquid composition when used for maintenance of a body of water, the liquid composition comprising a solution of magnesium and potassium salts, at least one of which is a halide salt.

In a further aspect of the invention, there is provided a method of maintaining a body of water comprising preparing a liquid composition outside of the body of water, and adding the liquid composition to the body of water, wherein the liquid composition comprises magnesium and potassium salts, at least one of which is a halide salt.

The liquid composition of the invention can also include a sodium salt.

Preferably the halide concentration of the liquid composition expressed as hypohalite is 100 000 ppm to 400 000 ppm.

The magnesium is present in the liquid composition as $Mg^{2+}$. Preferably, the $Mg^{2+}$ level ranges from about 6000 ppm to about 15 000 ppm.

The $Mg^{2+}$ can be formed from any soluble magnesium compound. Preferably the $Mg^{2+}$ is formed from a compound selected from the group consisting of magnesium sulphate, magnesium chloride, magnesium bromide, magnesium fluoride, magnesium iodide, magnesium borate, magnesium hydroxide, magnesium oxide, or a combination thereof.

The potassium in the liquid composition is present as $K^+$. Suitably, the liquid composition contains from 40 000 ppm to 120 000 ppm of $K^+$.

The $K^+$ can be formed from any soluble potassium salt. Preferably the $K^+$ is formed from a compound selected from the group consisting of potassium sulphate, potassium chloride, potassium bromide, potassium fluoride, potassium iodide, potassium borate, potassium hydroxide, potassium oxide, or a combination thereof.

The liquid composition may also contain sodium as $Na^+$. Suitably, when $Na^+$ is included, the $Na^+$ concentration is from 10 000 ppm to 40 000 ppm. The $Na^+$ can be derived from any suitably soluble salt, but is preferably derived from sodium chloride.

According to another aspect of the invention, there is provided a liquid composition for use in the aforementioned method, the liquid composition comprising:

| | |
|---|---|
| $Mg^{2+}$ | 6000 ppm to 15 000 ppm |
| $K^+$ | 40 000 ppm to 120 000 ppm |
| Hypohalite | 100 000 ppm to 400 000 ppm |

The liquid composition may also contain sodium as $Na^+$. Suitably, when $Na^+$ is included, the $Na^+$ concentration is from 10 000 ppm to 40 000 ppm. The $Na^+$ can be derived from any suitably soluble salt, but is preferably derived from sodium chloride.

Suitably, the body of water for the aspects of the invention described above is a swimming pool.

The liquid composition of the invention can be manufactured and packaged remote from the site of the body of water; transported to the site and added to the body of water. Alternatively, the liquid composition of the invention can be manufactured at the site of the body of water.

In order that the invention may be more readily understood and put into practice, one or more preferred embodiments thereof will now be described, by way of example only.

DETAILED DESCRIPTION OF THE INVENTION

Swimming pool owners are recommended to backwash the filtration system at regular intervals, such as weekly or fortnightly, to maintain the hygiene of the swimming pool water. Under more adverse conditions such as elevated summer time ambient conditions and/or contamination from windborne dust and the like, more frequent backwashing may be required to avoid clogging of the filter or reduced water flow therethrough.

In addition, after rain events, it may be necessary to reduce the water level in the pool to a desired level by pumping out excess water to a storm drain.

A typical filter pump will pump water to waste at a rate of about 350 liters per minute and a backwash cycle may be from 2 to 10 minutes depending upon the extent of contamination of the filtration medium. Over a year, this could result in a water consumption of between 35 kiloliters to 175 kiloliters, not taking into account evaporative losses.

Apart from the waste of a precious resource and the consequent cost to the community arising therefrom, many local government authorities are proposing serious financial penalties for users of water over a predetermined volume, typically an average household consumption value.

While other water conservation measures such as rainwater storage tanks and grey water reticulation systems for garden purposes have been proposed, overflow, backwash and rinse water from electrolytically chlorinated swimming pools is unsuited for garden use due to a high concentration of sodium chloride at about 6000 ppm.

Experiments have shown that by replacing NaCl at a recommended concentration of 6000 ppm with potassium chloride (KCl) at a concentration of about 2500 ppm to 3000 ppm, a chlorine concentration of between 1 ppm to 3 ppm of chlorine can be maintained in an electrolytically chlorinated swimming pool with no deleterious effects on pool water hygiene.

Moreover, the application of backwash water containing from 2500 ppm to 3000 ppm of KCl, along with suspended solids, to lawn grasses and to garden plants has over an extended period of time not shown any sign of "salt burn" which might otherwise be expected from the accumulation of NaCl in the soil. Lawn grasses and garden plants treated with the KCl containing backwash and rinse waters were found to have thrived with a healthy dark green foliage.

Further investigations into environmentally acceptable chlorine containing electrolytes revealed that magnesium chloride ($MgCl_2$) is used as a secondary fertilizer as a source of both magnesium and chloride ions essential for healthy plant development.

Moreover, magnesium is widely marketed as a complementary medicine as being linked to vital health functions including normal heart rhythms, proper muscle functions, normal protein synthesis and carbohydrate metabolism, proper operation of over 300 enzymes and helping the absorption of calcium and potassium. In the United States, the recommended daily dose of magnesium is up to 400 mg per day.

These findings are used in the improved swimming pool system which uses $Mg^{2+}$ and optionally $K^+$ for swimming pool water hygiene, and enables grey water usage of the swimming pool water.

As discussed above, it is now becoming mandatory for swimming pool systems to include a backup system of liquid chlorine (sodium hypochlorite) dosing. For conventional swimming pool systems, liquid chlorine is typically generated from sodium chloride solutions using equipment similar to salt water chlorinators. Liquid chlorine is typically high in sodium chloride salt and also has a high pH due to the presence of by-products of the electrolytic chlorination procedure.

With improved swimming pool systems which include primarily magnesium ions and optionally potassium ions, the use of liquid chlorine as backup system is problematic as dosing the swimming pool with this composition would adversely alter the ion ratios in the improved swimming pool system.

The liquid compositions of the invention are therefore used to dose these improved swimming pools as these compositions are not deleterious to the balance of electrolytes in the swimming pool system.

The liquid compositions of the invention can also be used to super-chlorinate or 'shock' treat these swimming pools when required, for example due to an algal bloom or contamination of the pool.

In Australia, all state-based health authorities mandate minimum free chlorine concentration and maximum total chlorine and combined chlorine concentrations, varying with water conditions. The most common minimum free chlorine is concentration is 2.0 ppm; maximum total chlorine concentration of 10 ppm and maximum combined chlorine of 0.5-1.0 ppm. Super-chlorination is used to minimise combined chlorine concentration. The pool is dosed with chlorine to a free chlorine concentration ten times that of the combined chlorine concentration in order to break down the latter.

The liquid composition of the invention can be manufactured and packaged remote from the site of the body of water; transported to the site and added to the body of water. Alternatively, the liquid composition of the invention can be manufactured at the site of the body of water, for example in a brine generator, and added to the body of water as it is produced.

Non-limiting examples of liquid compositions and methods of the invention follow.

Example 1

A liquid composition of the invention is made from 20% mineral concentrate (brine) as follows.
1. The mineral mixture is made by mixing:
Magnesium chloride hexahydrate (30% w/w);
Potassium chloride (55% w/w) and
Sodium chloride (15% w/w).
2. The mineral mixture (24% w/w) is dissolved in water (76% w/w) to give the brine.
3. The brine is electrolysed to give a liquid composition of the invention containing 23.04% w/w (230 390 ppm) chlorine as sodium hypochlorite.

Example 2

A liquid composition of the invention is made from 30% mineral concentrate (brine) as follows.
1. The mineral mixture is made by mixing:
Magnesium chloride hexahydrate (30% w/w);
Potassium chloride (55% w/w) and
Sodium chloride (15% w/w).
2. The mineral mixture (36% w/w) is dissolved in water (64% w/w) to give the brine.
3. The brine is electrolysed to give a liquid composition of the invention containing 34.56% w/w (345 586 ppm) chlorine as sodium hypochlorite.

Example 3: Sanitation Using Compositions of the Invention

The following example shows sanitation of an improved swimming pool as discussed above, using the composition of the invention (with 10% active ingredient) via automatic dosing.
1. Daily Operation

| Pool Type: | Outdoor Leisure Pool |
|---|---|
| Water Volume (L): | 675,000 |
| Turnover Time (hrs): | 3.5 |
| Filtrate (L/hr): | 193,000 |
| Minimum Sanitiser Concentration (ppm): | 2.0 ppm (unstabilised) |
| Sanitiser per Filtrate (L/hr): | 0.386 |
| Invention Composition per Filtrate @ 10% (L/hr): | 3.86 |

Therefore for normal daily operations a dosage rate of approximately 4 L/hr of the composition of the invention is required.
2. Shock Treatment

| Water Volume (m$^3$): | 675 |
|---|---|
| Pump Metering capacity (L/hr): | 27 |

For shock treatment of the pool a dosage rate of 27 L/hr of the Invention Composition is required.
3. Super-Chlorination The maximum allowable total chlorine concentration (TC) while a facility is in use is commonly 10.0 ppm. With a maximum combined chlorine concentration (CC) of no more than 30% of TC, this equates to a possible maximum CC concentration of 3.0 ppm. Such a high level of CC can occasionally be found at the end of a heavily loaded day or after steady accumulation over a period of a week or two, requiring over-night super-chlorination to reduce the CC concentration to less than 1.0 ppm.

| Water Volume (L): | 675,000 |
|---|---|
| Turnover Time (hrs): | 3.5 |
| Filtrate (L/hr): | 193,000 |
| CC Concentration (ppm): | 3.0 |
| FC Dosing Concentration (10x) (ppm): | 30 |
| FC per Filtrate (L/hr): | 5.8 |
| Invention Composition per Filtrate @ 10% (L/hr): | 58 |

Therefore for super-chlorination of the pool in the time of one complete turnover, a dosage rate of 58 L/hr of the composition of the invention is required.

The invention therefore provides a liquid electrolyte dosing system which will maintain the integrity of improved swimming pools.

By using the liquid composition of the invention in the method of the invention the quality of water of a swimming pool system is maintained and therefore water from backwashing, rinsing or filter bypass to reduce swimming pool levels will still be useful for watering gardens or other grey water applications and will remain less harmful to the environment when directed through a storm water drain or less harmful to process systems for sewer waste.

Throughout the specification the aim has been to describe the preferred embodiments of the invention without limiting the invention to any one embodiment or specific collection of features.

Throughout this specification, unless the context requires otherwise, the word "comprises", and variations such as "comprise" or "comprising", will be understood to imply the inclusion of a stated integer or group of integers or steps but not to the exclusion of any other integer or group of integers.

The invention claimed is:
1. A composition for a body of water, the composition comprising a solution of magnesium and potassium salts, at least one of which is a halide salt, wherein the magnesium salt in solution gives $Mg^{2+}$ in an amount from about 6000 ppm (w/w) to about 15 000 ppm (w/w).
2. The composition of claim 1 wherein the potassium salt gives $K^+$ in an amount from about 40 000 ppm (w/w) to about 120 000 ppm (w/w).
3. The composition of claim 1 wherein the halide is in the form of hypohalite, in an amount from about 100 000 ppm (w/w) to 400 000 ppm (w/w).
4. The composition of claim 1 wherein the magnesium salt is selected from the group consisting of one or more of magnesium sulphate, magnesium chloride, magnesium bromide, magnesium fluoride, magnesium iodide, magnesium borate, magnesium hydroxide and magnesium oxide.
5. The composition of claim 1 wherein the potassium salt is selected from the group consisting of one or more of potassium sulphate, potassium chloride, potassium bromide, potassium fluoride, potassium iodide, potassium borate, potassium hydroxide and potassium oxide.
6. The composition of claim 1 further comprising a sodium salt.
7. A method of treating a body of water comprising:
preparing a composition outside of the body of water, and
adding the composition to the body of water, wherein the composition comprises magnesium and potassium salts, at least one of which is a halide salt, wherein the magnesium salt in solution gives $Mg^{2+}$ in an amount from about 6000 ppm (w/w) to about 15 000 ppm (w/w).

8. A composition when used in the method of claim 7, the composition comprising:
   $Mg^{2+}$ from the magnesium salt in an amount of from about 6000 ppm (w/w) to about 15 000 ppm (w/w);
   $K^+$ from the potassium salt in an amount from about 40 000 ppm (w/w) to about 120 000 ppm (w/w); and
   hypohalite from the halide in an amount from about 100 000 ppm (w/w) to about 400 000 ppm (w/w).

9. The composition of claim 8 wherein the magnesium salt is selected from the group consisting of one or more of magnesium sulphate, magnesium chloride, magnesium bromide, magnesium fluoride, magnesium iodide, magnesium borate, magnesium hydroxide and magnesium oxide.

10. The composition of claim 8 wherein the potassium salt is selected from the group consisting of one or more of potassium sulphate, potassium chloride, potassium bromide, potassium fluoride, potassium iodide, potassium borate, potassium hydroxide and potassium oxide.

11. The composition of claim 8 further comprising $Na^+$.

12. The composition of claim 11 wherein the $Na^+$ is derived from sodium chloride.

* * * * *